United States Patent [19]

Garthwaite et al.

[11] Patent Number: 5,268,675
[45] Date of Patent: Dec. 7, 1993

[54] COMPUTER COMMAND AND POINTING DEVICE WITH MULTI-AXIS ENGAGEMENT ASSEMBLY

[75] Inventors: Charlie Garthwaite, Bellevue; Mike M. Paull, Seattle, both of Wash.; Kinzo Narmuo, Tokyo, Japan

[73] Assignee: Microsoft Corporation, Redmond, Wash.

[21] Appl. No.: 969,872

[22] Filed: Oct. 30, 1992

Related U.S. Application Data

[63] Continuation-in-part of Ser. No. 731,626, Jul. 17, 1991, which is a continuation-in-part of Ser. No. 598,562, Oct. 22, 1990, abandoned, which is a continuation-in-part of Ser. No. 425,527, Oct. 23, 1989, Pat. No. 5,187,468.

[51] Int. Cl.$^5$ ............................................. G09G 3/02
[52] U.S. Cl. .................................... 345/163; 248/918; 345/168
[58] Field of Search ................................ 340/706–711; 341/20, 22, 35; 400/717; 248/918; 178/18

[56] References Cited

U.S. PATENT DOCUMENTS

| | | | |
|---|---|---|---|
| 4,633,167 | 12/1986 | Kitts | 340/709 X |
| 4,799,049 | 1/1989 | Avila | 340/709 |
| 4,913,387 | 4/1990 | Tice | 248/918 |
| 4,933,670 | 6/1990 | Wislocki | 340/709 |
| 4,985,692 | 6/1991 | Breider et al. | 340/709 X |
| 5,049,863 | 9/1991 | Oka | 340/709 X |

OTHER PUBLICATIONS

Nassimbene, E. G., "Mouse/Keyboard Concept Incorporating Unique Devices For Controlling CRT Display Cursors," IBM Technical Disclosure Bulletin, Mar. 1985, pp. 6299–6305.

*Primary Examiner*—Ulysses Weldon
*Attorney, Agent, or Firm*—Seed and Berry

[57] ABSTRACT

A computer command and pointing device that attaches directly to the computer or keyboard without the need for external electrical cables. A BallPoint TM mouse has a multi-axis mechanical engagement assembly that allows the mouse to be inserted into a recess in the computer or keyboard and have its weight fully supported by the engagement assembly. The engagement assembly provides tight mechanical coupling between the mouse and the recess, but permits the disconnection of the mouse if excessive force is applied to the mouse. The engagement assembly includes an electrical connector that permits the coupling of electrical signals between the mouse and the computer. The connector pins in the electrical connector are individually spring-loaded to allow the connector pins to recede into the electrical connector when force is applied. A mating electrical connector plate, mounted within the recess, is a flat plate made of an insulating material with electrically conductive pads on the surface thereof. The connector pins of the electrical connector electrically couple electrical signals between the mouse and the computer when the engagement assembly mechanically couples the mouse into the recess. The electrical connector does not require precise alignment of the engagement assembly when installing or removing the mouse. If excessive force is applied to the mouse, it disconnects from the recess without damaging the mouse or the computer.

16 Claims, 9 Drawing Sheets

COMPUTER COMMAND AND POINTING DEVICE WITH MULTI-AXIS ENGAGEMENT ASSEMBLY

CROSS-REFERENCE TO RELATED APPLICATIONS

This application is a continuation-in-part of Ser. No. 07/731,626, filed Jul. 17, 1991, which is a continuation-in-part of Ser. No. 07/598,562, filed Oct. 22, 1990, now abandoned, which is a continuation-in-part of Ser. No. 07/425,527, filed Oct. 23, 1989, now U.S. Pat. No. 5,187,468.

TECHNICAL FIELD

This invention is related generally to a pointing device for entering commands into a computer, and more specifically to a pointing device with a multi-axis engagement assembly for direct connection to the computer.

BACKGROUND OF THE INVENTION

Numerous pointing devices for entering commands into a computer are well known in the art. For example, joy sticks, mouses, track balls, and computer pens are commonly used as pointing devices for entering commands into a computer. Many of these devices, such as a mouse and track ball, use a rotatable ball to determine position. Electronic encoders sense rotation of the ball and generate a signal indicative of the ball's rotation to control movement of the cursor on the screen of the computer. Most of these devices include one or more buttons to allow the selection of commands. Typically, a user will use the pointing device to position the cursor on a desired command on the computer display screen, and press a button to select the command. Prior art pointing devices, such as a mouse and a trackball, are not easily usable with a laptop or portable computers because they require a work surface on which to rest the trackball or on which to roll the ball contained within a mouse.

To overcome these problems, a device such as the BallPoint TM mouse, described in U.S. patent application Ser. No. 07/425,527, which is commonly assigned with the present invention, attaches to the side of a keyboard to allow pointing and command entry without the requirement of a work surface.

A drawback to pointing devices of the prior art, which was solved by the invention described in the above-referenced patent application, is that the pointing device must be attached in a manner that will prevent damage to the pointing device if excessive pressure is applied to the pointing device. The BallPoint TM mouse has release latches that provide a tight mechanical connection between the mouse and the computer, but permit the disconnection of the mouse if excessive pressure is applied. This is particularly useful in situations where a person inadvertently hits the BallPoint TM mouse and applies a shearing force to the mouse. The release latches allow the BallPoint TM mouse to pop off the computer so as not to damage the device.

A further drawback of prior part devices such as the mouse, the trackball, and the BallPoint TM mouse, is the requirement of an external cable coupling the electrical signals between the pointing device and the computer. An electrical cable from the pointing device generally plugs into an interface connector on the computer. The need for an external electrical cable makes the use of such pointing devices cumbersome in an environment such as an airplane or while sitting in a chair with no desk.

Therefore, it can be appreciated that there is a significant need for a pointing device that eliminates the drawbacks of the prior art.

SUMMARY OF THE INVENTION

The invention is embodied in a computer command and pointing apparatus with a mechanical engagement assembly and an electrical engagement assembly to allow the apparatus to be connected directly to the computer without the need for an external electrical cable. The mechanical engagement assembly provides tight mechanical connection of the apparatus to the computer, but permits the disconnection of the apparatus if excessive shearing force is applied. The disconnection occurs without damage to the mechanical or electrical components of the apparatus or the computer.

In one embodiment, the apparatus has a housing containing the pointing device. The electrical engagement assembly is mounted to the housing and contains a plurality of electrical connector pins. The electrical connector pins, which are individually spring-loaded, couple electrical signals between the apparatus and the computer without the need for an external electrical cable. The electrical connector port on the computer has a flat surface with electrically conductive pads disposed on the surface thereof. Electrical connection is established substantially in a single plane with spring-loaded connector pins making electrical contact with the electrical connector port. The electrical connection in one plane allows the apparatus to be coupled to the computer without the precise alignment of the electrical engagement assembly on the apparatus and the electrical connector port.

The inventive device may couple directly to the computer keyboard through a recess in the keyboard sized to receive the attachment assembly. The recess has a pair of flanges that provide tight mechanical coupling and maintain an electrical connection between the electrical connectors and an electrical connection port within the recess. Alternatively the inventive device may couple directly to the computer through a similar recess in the computer housing.

In an alternative embodiment, the electrical connector pins may be mounted within the recess in the computer or keyboard housing with the mating electrical connector plate being located within the computer command and pointing device.

DETAILED DESCRIPTION OF THE INVENTION

The present invention allows a BallPoint TM mouse to be coupled directly to a keyboard or computer without the need for an external cable. This has the twin advantages of simplifying the connection of the BallPoint TM mouse to the computer and eliminating the connection in the back of the computer where a pointing device is typically connected. Furthermore, the inventive device uses a multi-axis engagement assembly that provides a tight mechanical and electrical connection between the electric circuits in the inventive pointing device and the computer. The invention allows quick and easy electrical connection between the device and the computer without precise alignment of the electrical connectors. The engagement assembly permits the device to be disconnected without damage if excessive force is applied to the device.

Figure 1:
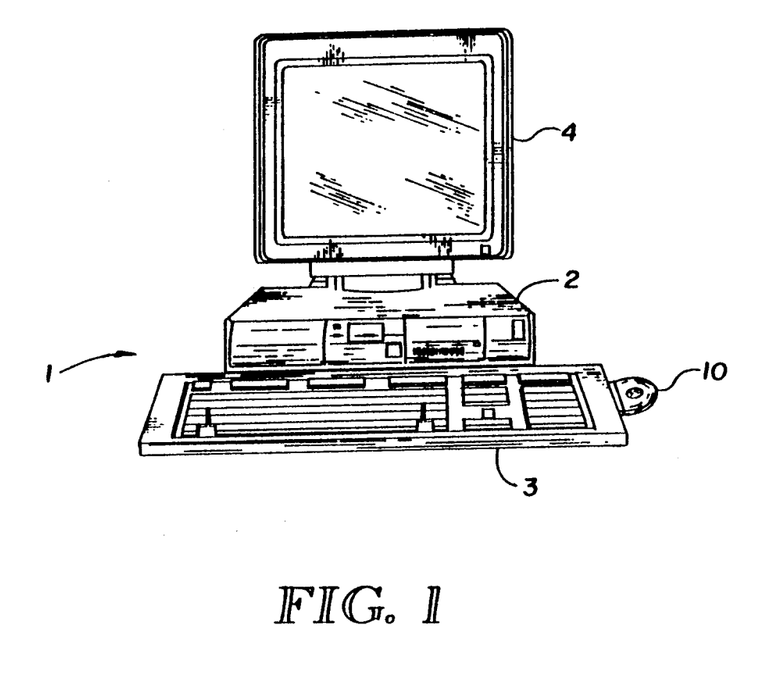
FIG. 1 illustrates the present invention coupled to a typical microcomputer.

A typical computer 1, illustrated in FIG. 1 comprises a computer housing 2, a computer keyboard 3, and a display screen 4. The present invention relates to a computer pointing and command apparatus 10, which may be coupled directly to the computer keyboard 3 or the computer housing 2.

Figure 2A:
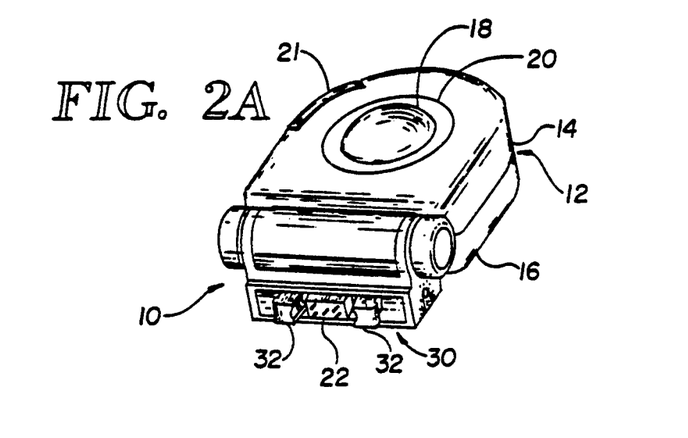
FIG. 2A is an isometric view of the inventive device.

The computer pointing and command apparatus 10 according to the present invention is shown in FIG. 2A. A housing 12, which contains electronic circuitry 13 (see FIG. 4), comprises a top case 14 and a bottom case 16. A ball 18 is retained within the housing by the bottom case 16 and a ball retainer ring 20. The ball 18 is used to position the cursor on a video display screen 4 (see FIG. 1) attached to the computer 1. A plurality of select buttons 21 are used to enter commands into the computer 1. The electronic circuitry 13 is used to detect rotational movement of the ball 18 as well as the position of the select buttons 21. The electronic circuitry 13 used to detect rotational movement of the ball and the position of the select buttons 21 is well known to those skilled in the art and will not be discussed herein.

Figure 2B:
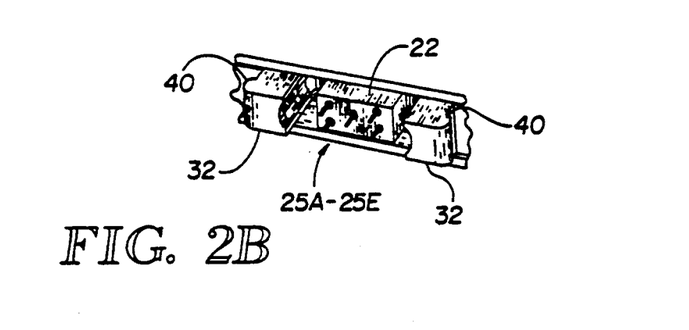
FIG. 2B is an enlarged fragmentary view of the electrical connector shown in FIG. 2A.

An electrical connector 22 couples the electrical signals between the apparatus 10 and the computer 1 (see FIG. 1). As can be seen in FIG. 2B, the electrical connector 22 has five electrical connector pins 25a to 25e to couple electrical signals between the apparatus 10 and the computer. In the presently preferred embodiment, four of the connector pins 25a to 25d carry electrical signals, while the fifth electrical connector pin 25e provides electrical shielding.

Figure 2C:
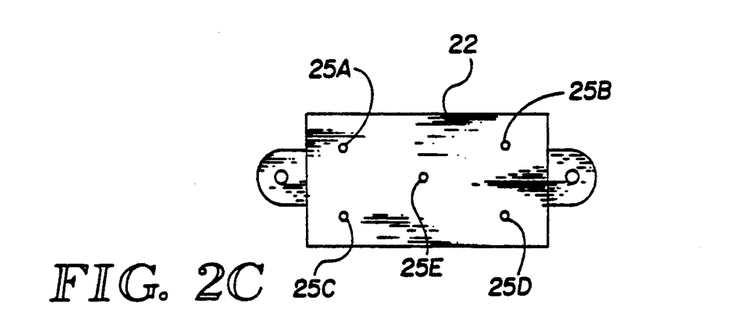
FIG. 2C is a front elevational view of the electrical connector shown in FIG. 2A.

The pin assignment of the electrical connector pins 25a to 25e are illustrated in FIG. 2C. Electrical connector pin 25a is +5 VDC and electrical connector pin 25b is Ground. The +5 VDC and Ground electrical connector pins 25a and 25b provide power to the apparatus 10. A Clock signal, provided on electrical connector pin 25c, provides timing signals to the apparatus 10. The Data electrical connector pin 25d allows both position information and command entry information to flow between the apparatus 10 and the computer 1. A shield is provided to the apparatus on electrical connector pin 25e. The shield reduces the pickup of electrical noise and protects the apparatus 10 and the computer 1 from electrostatic discharges.

The pin assignment described above is important because the apparatus 10 may inadvertently be plugged into the computer 1 (see FIG. 1) upside down. The pins assignments for the electrical connector pins 25a to 25e are selected so that no damage will occur to the electronic circuitry 13 in the apparatus 10 or to the computer 1 if the apparatus is plugged in upside down. The electrical connector pins 25a to 25e mate with the appropriate corresponding conductive pads of a mating electrical connector plate 52 (see FIG. 5A). The connector pins 25a to 25e are gold plated to provide good electrical conductivity and resistance to oxidation, however, any suitable material may be used.

Figure 3:
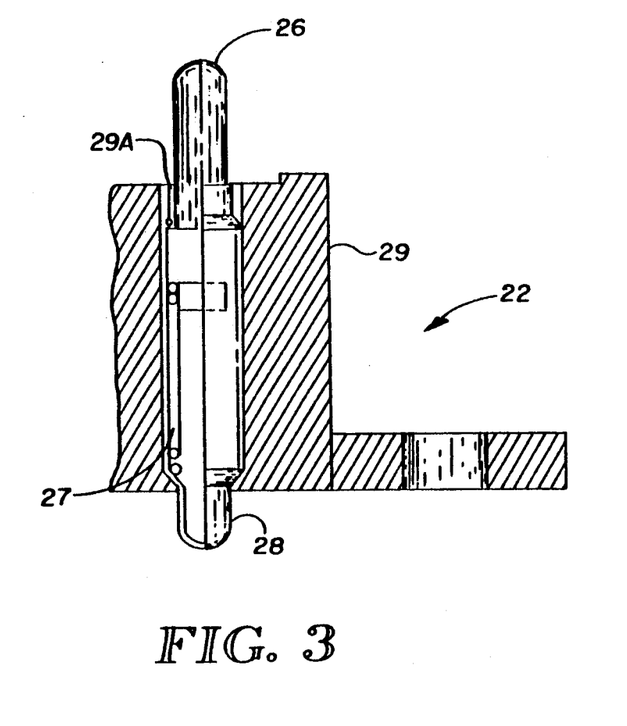
FIG. 3 is an enlarged, cross-sectional, fragmentary view of the electrical connector shown in FIG. 2A.

Each of the electrical connector pins 25a to 25e in the electrical connector 22 is spring-loaded to facilitate electrical coupling between the apparatus 10 and the computer 1 (see FIG. 1). As best seen in FIG. 3, each electrical connector pin 25a to 25e has an electrical contact surface 26, which provides electrical contact between the apparatus 10 and the computer 1. A spring 27 in each electrical connector pin 25a to 25e allows the electrical contact surface 26 to move longitudinally if pressure is applied to the end of the electrical contact surface 26. An electrical contact 28, which is fixed in position, allows the electrical connector pins 25a to 25e to be connected to the electronic circuitry 13 (see FIG. 2A). The electrical contact 28 may be designed for mounting on a printed circuit board or with electrical wires. The electrical connector pins 25a to 25e are mounted within and extend outward from an electrical insulating material 29, which holds the electrical connector pins 25a to 25e in place and insulates the electrical connector pins 25a to 25e from each other. When contact pressure is applied to an electrical connector pin 25a to 25e it moves longitudinally to retract within a cavity 29a in the electrical insulating material 29. The advantages of the spring-loaded electrical connector pins 25 in the electrical connector 22 will be discussed below.

Figure 4:
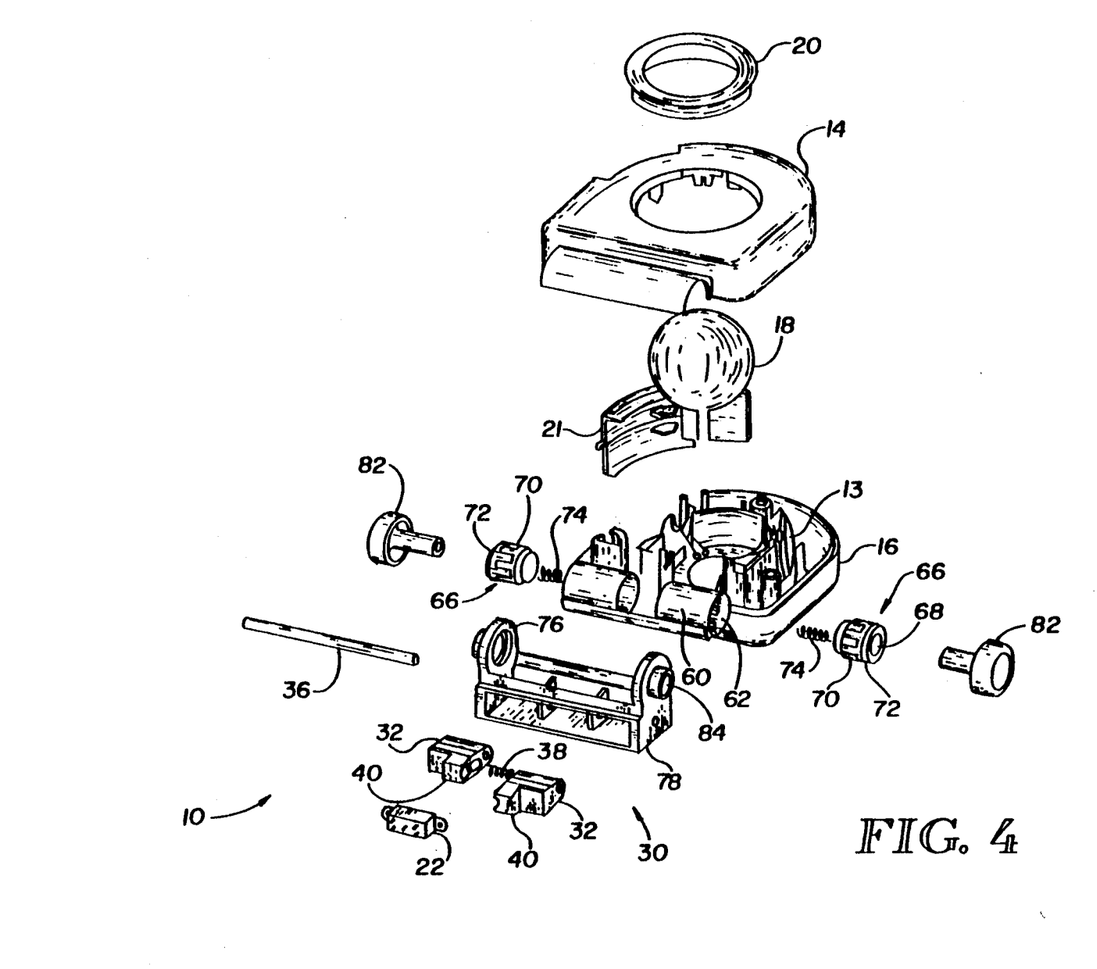
FIG. 4 is an exploded isometric view of the device of FIG. 2A.

The apparatus 10 is mechanically mounted to the computer by a multi-axis mechanical engagement assembly 30 (see FIG. 2A). As best seen in FIG. 4, the mechanical engagement assembly 30 comprises a pair of release latches 32, a release positioner 34, a release shaft 36, and a release shaft spring 38. The release latches 32 provide a tight mechanical connection between the apparatus 10 and the computer 1 (see FIG. 1). However, if excessive shearing force is applied to the apparatus 10, the release latches 32 allow the disconnection of the apparatus from the computer 1 without causing damage to the computer or the apparatus.

As illustrated in FIG. 2B, the release latches 32 each have a tab 40 on a laterally outward end. The tabs 40 mate with a pair of mating flanges 54 (see FIG. 5B) to provide the tight mechanical fit. Returning now to FIG. 4, the release latches 32 are mounted on the release shaft 36, and are forced apart by the release shaft spring 38. The release shaft spring 38 has sufficient resiliency that it normally holds the release latches 32 spaced apart. When the apparatus 10 is installed on the computer housing 2 (see FIG. 1) or the computer keyboard 3, the mechanical engagement assembly 30 mechanically couples the apparatus 10 and the computer or keyboard.

Figure 5A:
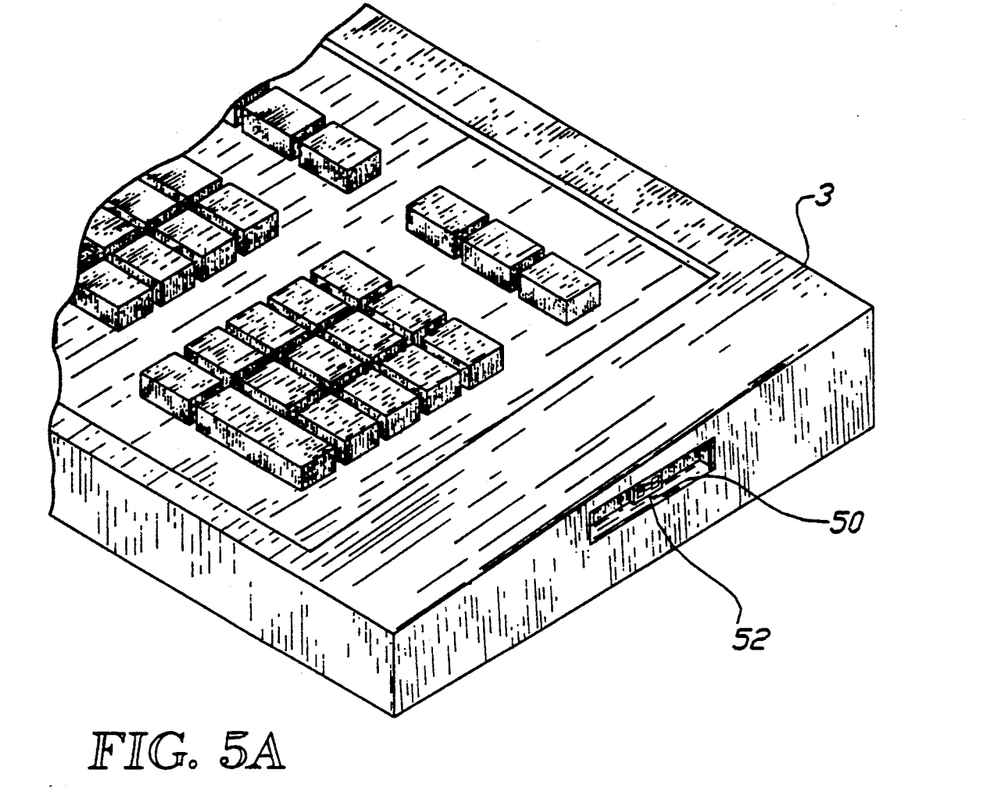
FIG. 5A is an isometric, fragmentary view of the mating recess used with the device of FIG. 2A.
Figure 5B:
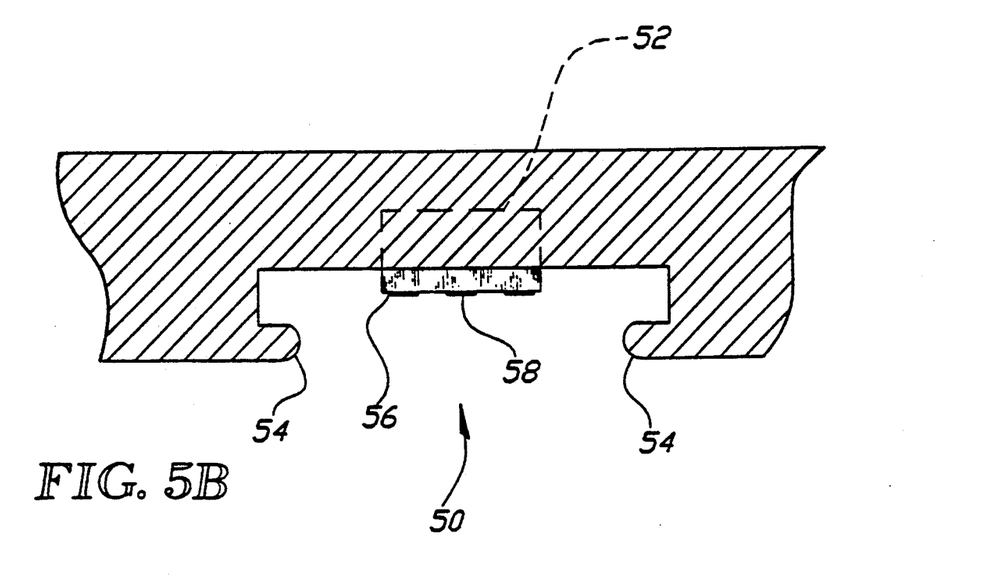
FIG. 5B is a cross-sectional view of the mating recess shown in FIG. 5A viewed from above.

The present invention is designed to allow the direct electrical connection of the apparatus 10 to the computer 1 (see FIG. 1). The computer 1 must have a recess sized to receive the mechanical engagement assembly 30. As seen in FIG. 5A, the computer keyboard 3 contains a recess 50 along one side wall. Contained within the recess 50 is the mating electrical connector plate 52, which will be discussed in detail below. As illustrated in FIG. 5B, the recess 50 has a pair of flanges 54 that are spaced apart to receive the tabs 32 (see FIG. 1B) of the release latches 32 to mechanically couple the apparatus 10 to the computer keyboard 3. As the mechanical engagement assembly 32 is inserted into the recess 50, the flanges 54 overcome the laterally outward spring force the release shaft spring 38 applies to the release latches 32 and force the release latches to move closer together. As the mechanical engagement assembly 30 is inserted into the recess 50, the release latches 32 move closer together as the release shaft spring 38 compresses, thereby permitting the tabs 40 to be positioned behind the flanges 54 of the recess. When positioned within the recess 50 behind the flanges 54, the release shaft spring 38 then urges the release latches 32 apart such that the tabs 40 are locked in position behind the flanges 54. The apparatus 10 is thus mechanically coupled to the computer keyboard 3. While the examples presented herein illustrate the direct connection of the apparatus 10 to the keyboard housing 3, it is obvious that the apparatus 10 may also be coupled directly to the computer housing 2 (see FIG. 1), as may be useful with a laptop computer. If the apparatus 10 is coupled directly to the computer housing 2, the recess 50 is located in the computer housing 2 instead of the computer keyboard 3.

If the computer 1 does not contain the recess 50, an adapter (not shown) may be attached to the computer to provide the recess. The adapter contains the recess 50 and the mating electrical connector plate 52 mounted within the recess. A cable from the adapter couples the apparatus 10 to the computer 1, as is common with typical pointing devices.

If the apparatus 10 is removed from the recess 50 intentionally, or inadvertently by the application of excessive shearing force, the mechanical engagement assembly 30 disconnects from the recess 50 because the flanges 54 force the release latches 32 to move closer together on the release shaft 36 thus overcoming the resiliency of the release shaft spring 38. This allows the apparatus 10 to be easily disengaged from the computer 1.

The apparatus 10 is designed so that its entire weight is supported by the release latches 32. This allows the device to be used without a desktop. It is particularly useful in situations such as an airplane, where a limited amount of workspace is available.

Prior art electrical connectors, such as a DB-15 connector, use a well known pin and socket arrangement. One portion of the DB-15 connector has a series of electrical pins, while the mating portion of the electrical connector contains sockets designed to receive the pins. To plug the connector pins into the mating sockets, it is necessary to move the connector pins in a plane substantially perpendicular to the plane of the mating sockets. If one attempts to plug the prior art connector in at any other angle, there is a great risk of damaging the pins or mating sockets. Similarly, the connector must be carefully removed at the same perpendicular angle to avoid damaging the pins or mating sockets. If a force, such as a shearing force, is applied to the connector, the pins, the mating sockets, or both, may be damaged. Connectors such as a DB-15 connector usually require a retaining mechanism such as retaining screws to hold the pins firmly within the mating sockets. If the retaining screws are not properly secured, the connector may not be firmly seated. The result is a poor electrical contact or, in extreme cases, no electrical contact at all.

In contrast, the electrical connector 22 of the present invention allows the apparatus 10 to be inserted within the recess 50 of the computer 1 at a plurality of angles without damaging either the electrical connector 22 or the mating electrical connector plate 52 (see FIG. 5A) that mates with the electrical connector 22. The apparatus 10 can be disconnected from the recess 50, in the manner described above, without damaging either the electrical connector 22 or the mating electrical connector plate 52 (see FIG. 5A).

When the mechanical engagement assembly 32 is fully inserted into the recess 50 as described above, the electrical connector pins 25a to 25e of the electrical connector 22 make electrical contact with the mating electrical connector plate 52 mounted within the recess 50 (see FIG. 5A). As seen in FIG. 5B, the mating electrical connector plate 52 in the presently preferred embodiment has a flat surface 56 made of a plastic insulating material having plurality of electrically conductive pads 58 that mate with the electrical connector pins 25a to 25e (see FIG. 2A) when the apparatus 10 is mechanically coupled within the recess 50. The electrically conductive pads 58 are flat and made of gold plated metal, and are mechanically secured within the plastic insulating material.

It is obvious that there are many possible alternative embodiments for the mating electrical connector plate 52. For example, the electrically conductive pads 58 may be raised rounded surfaces, mounted on the insulating material. Alternatively, the mating electrical connector plate 52 may be a flat plate made of an insulating material with printed circuit traces on the surface to couple electrical signals between the computer 1 and the electrical connector pins 25a to 25e. The choice of gold plating is also not critical to satisfactory use of the apparatus 10 and was chosen for its conductive properties and its resistance to oxidation.

Figure 6A:
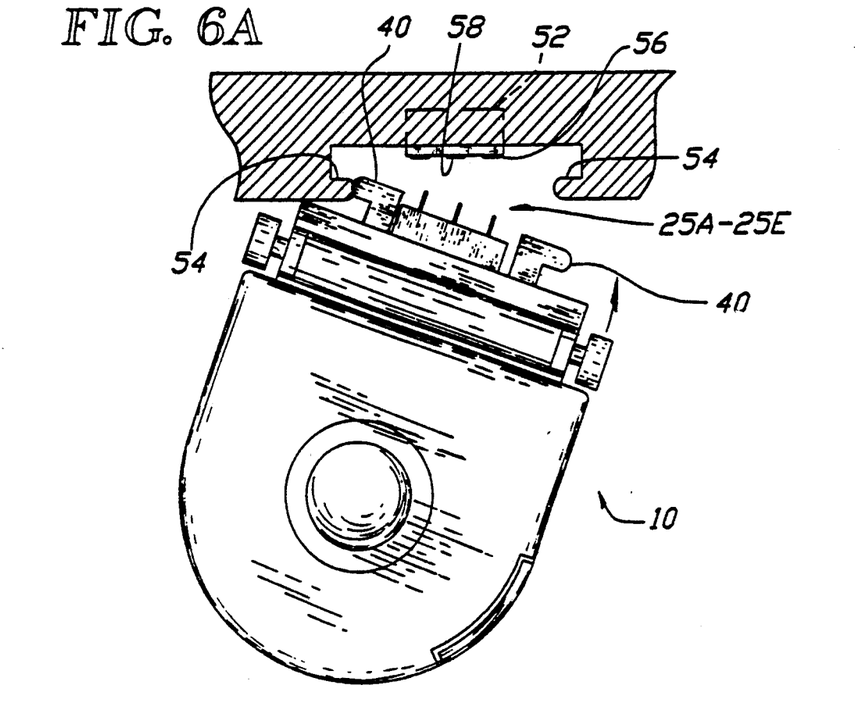
FIGS. 6A, 6B, and 6C are fragmentary cross-sectional views of the mating recess shown in FIG. 5A from above as the inventive apparatus is mechanically and electrically engaged.
Figure 6B:
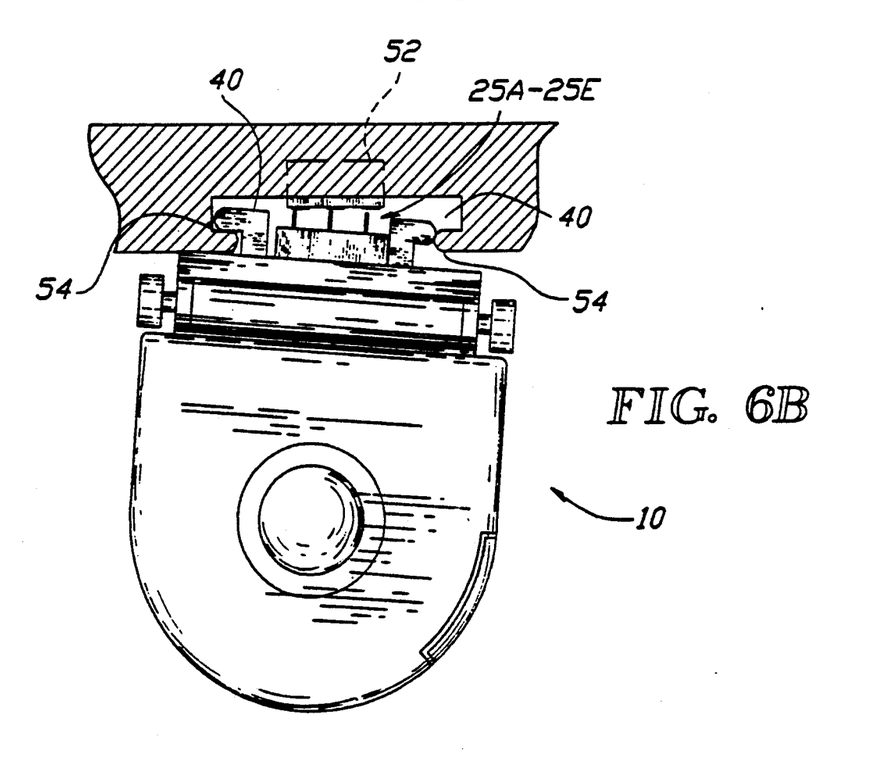
Figure 6C:
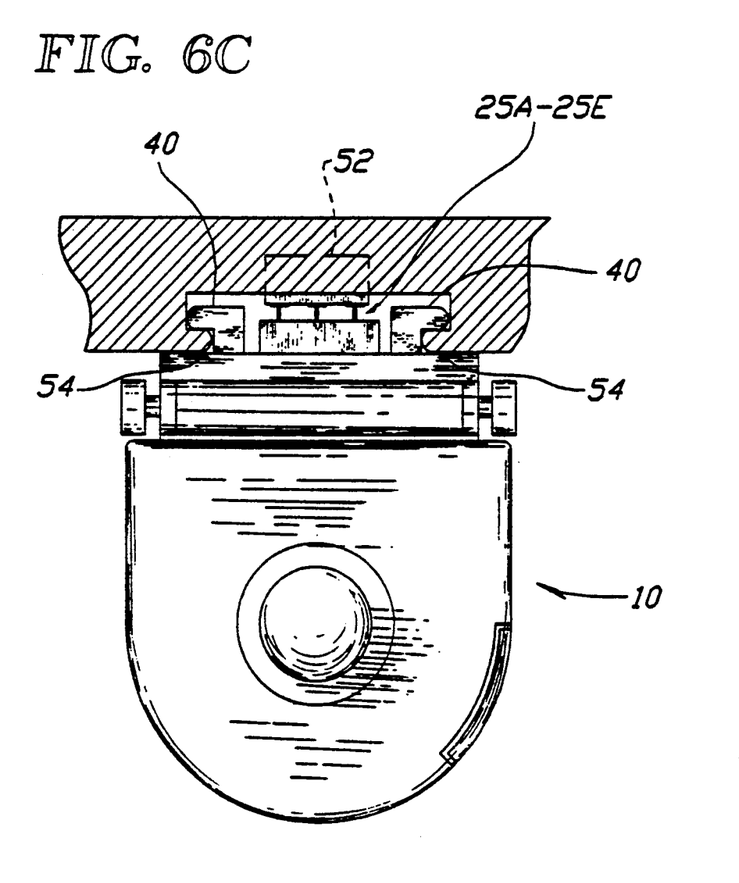

As discussed above, the electrical connector pins 25a to 25e in the electrical connector 22 are individually spring-loaded. This allows the electrical connector pins 25a to 25e move longitudinally within the electrical connector 22. As the mechanical engagement assembly 30 is inserted into the recess 50, the individual electrical connector pins 25a to 25e move independently of one another. The apparatus 10 may be mechanically engaged by slipping one tab 40 of the release latches 32 behind the flange 54 on one side of the recess 50. The remaining tab 40 is pressed against the remaining flange 54 to complete the mechanical engagement process. The independent movement of the spring-loaded electrical connector pins 25a to 25e allows the release latches 32 to be inserted in the manner described above without damaging the electrical connector pins 25a to 25e. When one tab 40 of the release latches 32 is inserted behind flange 54, the plane of the electrical connector 22 is not parallel to the plane of the mating electrical connector plate 52, as shown in FIG. 6A. Since the mating electrical connector plate 52 is flat and the electrical connector pins 25a to 25e are spring-loaded, there is no critical angle at which the electrical connector 22 must be inserted into the recess 50 to avoid damage, as is the case in the prior art. As the mechanical engagement assembly 30 further engages the recess 50, some of the electrical connector pins 25a to 25e are moved longitudinally to retract within the cavity 29a (see FIG. 3) as the spring 27 compresses as the electrical connector pins 25a to 25e make contact with the corresponding electrically conductive pads 58 on the mating electrical connector plate 52, as seen in FIG. 6B. When the apparatus 10 is completely engaged within the recess 50, the plane of the electrical connector 22 is now parallel to the plane of the mating electrical connector plate 52. The spring-loaded electrical connector pins 25a to 25e are urged outward from the electrical connector 22 by the spring 28 (see FIG. 3) to make good electrical contact with the mating electrical connector plate 52. Thus, electrical contact between the apparatus 10 and the computer 1 occurs substantially within a single plane defined by the flat surface of the electrically conductive pads 58 of the mating electrical connector plate 52.

As with insertion, there is also no critical angle at which the electrical connector 22 must be removed from the recess 50 to avoid damage. If the apparatus 10 is removed intentionally or inadvertently by the application of excessive force, the connector pins 25 will not be damaged because they are not inserted within the confines of mating sockets typically found in the prior art. Thus, the present invention provides for mechanical and electrical coupling between the apparatus 10 and the computer 1 without the need for external electrical cables. The apparatus 10 may be easily inserted without concern for critical angles of insertion and removal.

While the foregoing description illustrates an embodiment in which the electrical connector pins 25a to 25e are mounted on the apparatus 10, the same inventive principles allow the location of the electrical connector pins 25a to 25e within the recess 50. In this embodiment the mating electrical connector plate 52 is located on the apparatus 10, and electrical contact is made in the same manner described above.

Figure 7A:
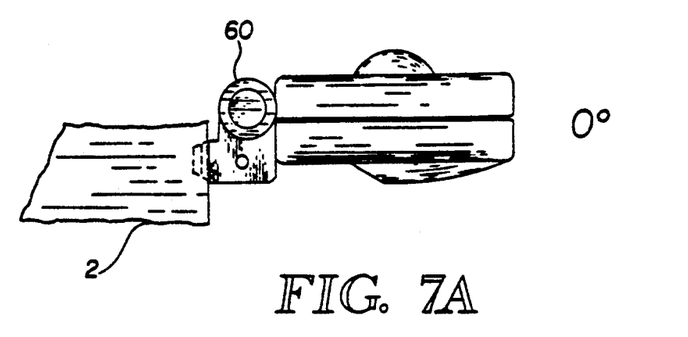
FIGS. 7A, 7B, and 7C are side elevational views of the inventive device coupled directly to the computer housing, and illustrating three angles at which the device of FIG. 2A may be set.

As shown in FIG. 7A, the apparatus 10 may be mechanically coupled to the computer housing 2 at an angle of 0° with respect to the computer housing 2. However, the apparatus 10 may be positioned at a plurality of other angles with respect to the computer housing 2, such as the two angles shown in FIGS. 7B and 7C. This permits the apparatus 10 to be positioned at an angle best suited for the particular user.

Figure 8:
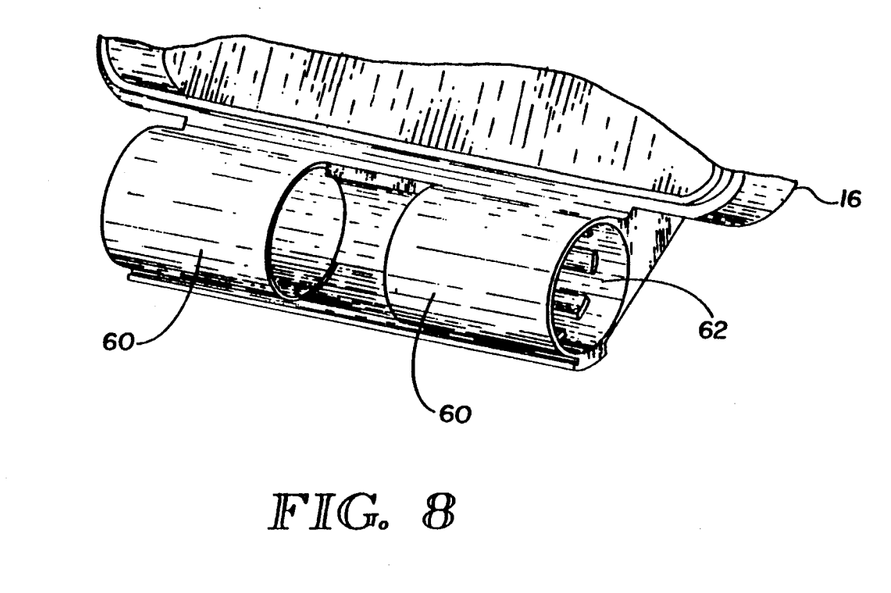
FIG. 8 is an enlarged, fragmentary, isometric view of an adjustment mechanism used to set the desired angle of the device of FIG. 2A.

To allow angular adjustment of the apparatus 10, the bottom case 16 contains a pair of pivoting members 60. As best illustrated in FIGS. 4 and 8, each pivoting member 60 includes a tube 62 having a laterally outward opening recess. As seen in FIG. 4, a detent key 66 having a detent recess 68, a shaft portion 70 and a head 72, is positioned within the recess of each tube 62. The recess in each tube 62 includes ridges and grooves for mating with the corresponding ridges and grooves of the shaft portion 70 of the detent key 66. A positioner spring 74 within each tube 62 urges the detent key 66 outward from the tube 62 such that the head 72 of the detent key 66 engages a positioner recess 76 within a release positioner 78.

In operation, the ridges and grooves on the shaft portion 70 of each detent key 66 engages the mating ridges and grooves in the recess of the tube 62. The positioner spring 74 within each tube 62 causes the head 72 of the detent key 66 to engage the positioner recess 76 of the release positioner 78. In this manner, the case 12 is locked at an angle selected by the user.

To change the angle of the case 12 with respect to the computer housing 2 (see FIGS. 7A–7C), a pair of tilt buttons 82 are mounted through a pair of holes 84 in the release positioner 78, and are frictionally mounted within the detent recess 68 of each detent key 66. The user depresses the tilt buttons 82, thus causing the head 72 of each detent key 66 to disengage from the positioner recess 76 of the release positioner 78. The user may then adjust the case 12 to the desired angle. When the tilt buttons 82 are released, the positioner springs 74 urge the head 72 of each detent key 66 against each positioner recess 76 of the release positioner 78 to again lock the case 12 at the selected angle.

Figure 7B:
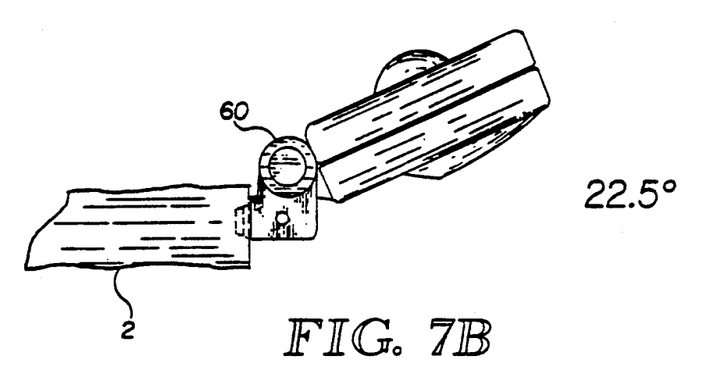
Figure 7C:
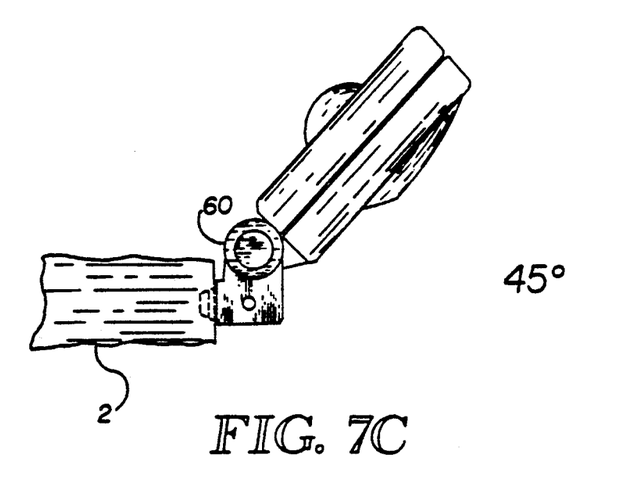

It is clear that the number of angles provided for adjustment depends upon the shape of the head 72 and the positioner recess 76. In the presently preferred embodiment the apparatus can be positioned in one of three positions, as illustrated in FIGS. 7A to 7C.

It is to be understood that even though various embodiments and advantages of the present invention have been set forth in the foregoing description, the above disclosure is illustrative only, and changes may be made in detail, yet remain within the broad principles of the present invention. Therefore, the present invention is to be limited only by the appended claims.

We claim:

1. A computer system using a command apparatus for entering commands into a computer, the system comprising:

a command apparatus housing;

a pointing device within said apparatus housing;

a selectively releasable mechanical engagement assembly fixed to said apparatus housing to mechanically couple said apparatus housing to the computer and release said apparatus housing from the computer;

a pair of spaced apart opposing side walls defining a recess in the computer;

a pair of flanges extending from said side walls, said flanges being adapted to mechanically retain the apparatus within said recess to mechanically couple the apparatus to the computer;

an electrical connection port within said recess to permit coupling of electrical signals between the computer and the apparatus when the apparatus is mechanically retained within said recess, said port comprising a flat surface made of electrically insulative material and a plurality of electrically conductive surfaces disposed on said flat surface in a single plane to make electrical contact with the apparatus; and an electrical engagement assembly on the apparatus allowing the connection of electrical signals between the computer and the apparatus when said mechanical engagement assembly is mechanically coupled to the computer, said electrical engagement assembly providing electrical contact with said conductive surfaces in said single plane, whereby the apparatus may be mechanically and electrically coupled to the computer from a plurality of angles to permit said electrical signals to be coupled between the apparatus and the computer without the need for external electrical cables therebetween.

2. The apparatus of claim 1 wherein said electrical engagement assembly contains a plurality of spring-loaded electrical connector pins, each of said pins being retractably mounted within said electrical engagement assembly to independently move longitudinally when pressure is applied to said pins.

3. The computer of claim 1 wherein said electrically conductive surfaces are flat surfaces on said electrically insulative flat surface.

4. The computer of claim 1 wherein said recess is located in a side wall of a computer keyboard, the apparatus being mechanically and electrically coupled to said computer keyboard.

5. A computer system using a command apparatus for entering commands into a computer, the system comprising:
- a selectively releasable mechanical engagement assembly fixed to the apparatus to mechanically couple the apparatus to the computer and release the apparatus from the computer;
- a pair of spaced apart opposing side walls defining a recess in the computer;
- a pair of flanges extending from said side walls, said flanges being adapted to mechanically retain the apparatus within said recess to mechanically couple the apparatus to the computer;
- an electrical connection port within said recess to permit coupling of electrical signals between the computer and the apparatus when the apparatus is mechanically retained within said recess, said port comprising a surface made of electrically insulative material and a plurality of electrically conductive portions disposed with a planar arrangement on said surface to make electrical contact with the apparatus; and
- an electrical engagement assembly on the apparatus allowing the connection of electrical signals between the computer and the apparatus when said mechanical engagement assembly is mechanically coupled to the computer, said electrical engagement assembly providing electrical contact with said conductive portions in a single plane, whereby the apparatus may be mechanically and electrically coupled to the computer from a plurality of angles to permit said electrical signals to be coupled between the apparatus and the computer without the need for external electrical cables therebetween.

6. The apparatus of claim 5 wherein said electrical engagement assembly contains a plurality of spring-loaded electrical connector pins, each of said pins being retractably mounted within said electrical engagement assembly to independently move longitudinally when pressure is applied to said pins.

7. The computer of claim 5 wherein said electrically conductive surfaces are flat surfaces on said electrically insulative flat surface.

8. The computer of claim 5 wherein said recess is located in a side wall of a computer keyboard, the apparatus being mechanically and electrically coupled to said computer keyboard.

9. A computer designed to receive a computer pointing and command apparatus, the computer pointing apparatus having an electrical connector containing a plurality of mating electrical conductors to electrically couple the pointing and command apparatus to the computer, allowing the direct connection of electrical signals between the pointing and command apparatus and the computer, the computer comprising:
- a pair of spaced apart opposing side walls defining a recess in the computer;
- a pair of flanges extending from said side walls, said flanges being adapted to mechanically retain the pointing and command apparatus within said recess to mechanically couple the pointing and command apparatus to the computer; and
- an electrical connection port within said recess to permit coupling of electrical signals between the computer and the pointing and command apparatus when the pointing and command apparatus is mechanically retained within said recess, said port comprising a surface made of electrically insulative material and a plurality of electrically conductive portions disposed with a planar arrangement on said surface to make electrical contact with the mating electrical connectors on the pointing and command apparatus.

10. The computer of claim 9 wherein said electrically conductive surfaces are flat surfaces on said electrically insulative flat surface.

11. The computer of claim 9 wherein said recess is located in a side wall of a computer keyboard, the pointing and command apparatus being mechanically and electrically coupled to said computer keyboard.

12. A computer command apparatus for entering commands into a computer, the computer having a mating connector designed to couple electrical signals between the computer and the apparatus, the mating connector comprising a surface made of electrically insulative material and a plurality of electrically conductive portions disposed with a planar arrangement on the surface to make electrical contact with the pointing and command apparatus, the apparatus comprising:
- a housing;
- a pointing device within said housing;
- a selectively releasable mechanical engagement assembly fixed to said housing to mechanically couple said housing to the computer and release said housing from the computer; and
- an electrical engagement assembly allowing the connection of electrical signals between the computer and the apparatus when said mechanical engagement assembly is mechanically coupled to the computer, said electrical engagement assembly providing electrical contact with the mating electrical connector in the single plane, whereby the apparatus may be mechanically and electrically coupled to the computer at a plurality of angles at which said mechanical engagement assembly initially contacts the computer to permit said electrical signals to be coupled between the apparatus and the computer.

13. The apparatus of claim 12 wherein said electrical engagement assembly contains a plurality of spring-loaded electrical connector pins, each of said pins being retractably mounted within said electrical engagement assembly to independently move longitudinally when pressure is applied to said pins.

14. A computer command apparatus for entering commands into a computer, the computer having a mating connector designed to couple electrical signals between the computer and the apparatus, the mating connector comprising a surface made of electrically insulative material and a plurality of electrically conductive portions disposed with a planar arrangement on the surface to make electrical contact with the pointing and command apparatus, the apparatus comprising:

a selectively releasable mechanical engagement assembly fixed to the apparatus to mechanically couple the apparatus to the computer and release the apparatus from the computer; and an electrical engagement assembly allowing the connection of electrical signals between the computer and the apparatus when said mechanical engagement assembly is mechanically coupled to the computer, said electrical engagement assembly providing electrical contact with the mating electrical connector in the single plane, whereby the apparatus may be mechanically and electrically coupled to the computer at a plurality of angles to permit said electrical signals to be coupled between the apparatus and the computer.

15. The apparatus of claim 14 wherein said electrical engagement assembly contains a plurality of spring-loaded electrical connector pins, each of said pins being retractably mounted within said electrical engagement assembly to independently move longitudinally when pressure is applied to said pins.

16. The apparatus of claim 15 wherein said plurality of electrical connector pins comprise first, second, third, fourth, and fifth electrical connector pins, said first and fourth electrical connector pins being positioned across from each other on a first diagonal, and said second and third electrical connector pins being positioned across from each other on a second diagonal in a generally rectangular pattern, said fifth electrical connector pin being positioned at an intersection of said first and second diagonals.

* * * * *